(12) United States Patent
Dussault et al.

(10) Patent No.: US 11,019,957 B2
(45) Date of Patent: Jun. 1, 2021

(54) COLDWAVE APPLIANCE

(71) Applicant: IceColdNow, Inc., Braintree, MA (US)

(72) Inventors: David Dussault, Stoneham, MA (US); Benjamin J. Beck, Boston, MA (US); Douglas A. Marsden, Marblehead, MA (US); Ryan J. Donovan, Watertown, MA (US)

(73) Assignee: IceColdNow, Inc., Braintree, MA (US)

( * ) Notice: Subject to any disclaimer, the term of this patent is extended or adjusted under 35 U.S.C. 154(b) by 347 days.

(21) Appl. No.: 15/976,966

(22) Filed: May 11, 2018

(65) Prior Publication Data

US 2018/0344074 A1    Dec. 6, 2018

Related U.S. Application Data

(63) Continuation of application No. PCT/US2016/047249, filed on Aug. 17, 2016.
(Continued)

(51) Int. Cl.
*A47J 31/44* (2006.01)
*F25D 31/00* (2006.01)
(Continued)

(52) U.S. Cl.
CPC ............. *A47J 31/44* (2013.01); *A47J 31/467* (2013.01); *F25B 1/00* (2013.01); *F25D 31/002* (2013.01)

(58) Field of Classification Search
CPC . A47J 31/44; A47J 31/467; F25B 1/00; F25D 31/002
(Continued)

(56) References Cited

U.S. PATENT DOCUMENTS 2,432,546 A * 12/1947 Tanner ............... F25D 31/003
62/178
4,407,356 A   10/1983 DeLau
(Continued)

FOREIGN PATENT DOCUMENTS

| CN | 101980637 A | 2/2011 |
|----|----|----|
| CN | 201839768 U | 5/2011 |

(Continued)

OTHER PUBLICATIONS

Machine Translation of Japanese Patent Publication JPH01312374A, Hosoda, 1989 (Year: 1989).*
(Continued)

*Primary Examiner* — Dana Ross
*Assistant Examiner* — Michael S. Poetzinger
(74) *Attorney, Agent, or Firm* — Pierce Atwood LLP (57) ABSTRACT

A coffee appliance includes a powered cooling system integrated with and matched to a hot coffee brewer, configured to cool freshly-brewed coffee by thermal contact to chill a small batch of fresh-brewed coffee in a cooled receiving vessel. The vessel has an evaporator coil to ice the beverage. The cooling system is a robust system, a phase change refrigerant compression-type system employing a positive-displacement compressor, sized in relation to its rate of thermal cooling and the temperature of the beverage and the thermal mass and conductivity of the fluid-contacting assembly, bringing hot coffee to an ice-cold temperature, 2-5° C., on demand and quickly. The fresh brewed, flash-cooled coffee has undiluted and undegraded flavor. An integrated appliance includes a coffee brewer and cooler in a single device, and a slide switch or valve allows the user to select hot or iced coffee.

30 Claims, 6 Drawing Sheets

Related U.S. Application Data (60) Provisional application No. 62/254,993, filed on Nov. 13, 2015.

(51) Int. Cl.
    *F25B 1/00*      (2006.01)
    *A47J 31/46*      (2006.01)

(58) Field of Classification Search
    USPC ............ 99/280, 470; 222/146.1, 146.6
    See application file for complete search history.

(56) References Cited

U.S. PATENT DOCUMENTS

| | | | |
|---|---|---|---|
| 5,235,902 A | | 8/1993 | Ogawa |
| 5,577,393 A | * | 11/1996 | Donselman ............ B67D 3/00 222/146.6 |
| 5,724,883 A | | 3/1998 | Usherovich |
| 5,970,732 A | | 10/1999 | Menin et al. |
| 6,474,093 B1 | | 11/2002 | Fink et al. |
| 2001/0050004 A1 | | 12/2001 | Ugolini |
| 2005/0056044 A1 | | 3/2005 | Allison |
| 2005/0103203 A1 | | 5/2005 | Takizawa |
| 2011/0014339 A1 | | 1/2011 | Stahl et al. |
| 2011/0045152 A1 | | 2/2011 | Stutz et al. |
| 2011/0171350 A1 | | 7/2011 | Remo |
| 2016/0073819 A1 | * | 3/2016 | Licare ................ A47J 31/462 426/425 |
| 2017/0035236 A1 | * | 2/2017 | Zhao ................... F25D 29/008 |

FOREIGN PATENT DOCUMENTS

| | | |
|---|---|---|
| CN | 102549360 A | 7/2012 |
| CN | 202355212 U | 8/2012 |
| CN | 102920063 A | 2/2013 |
| CN | 103040363 A | 4/2013 |
| EP | 2478803 A1 | 7/2012 |
| JP | 61-159924 A | 7/1986 |
| JP | 1-312374 A | 12/1989 |
| JP | H0492615 A | 3/1992 |
| JP | 3143319 U | 7/2008 |
| JP | 2011-19907 A | 2/2011 |
| JP | 2011518625 A | 6/2011 |
| WO | 2015127654 A1 | 9/2015 |
| WO | 2015128619 A1 | 9/2015 |

OTHER PUBLICATIONS

Canadian Office Action dated May 31, 2019 in CA Patent Application No. 3005187.
European Search Report dated Jun. 18, 2019 in EP Patent Application No. 16864711.3.
Chinese Office Action dated May 28, 2019 in CN Patent Application No. 201680065368.3.
International Search Report and Written Opinion of the International Search Authority in PCT/US16/47249 dated Dec. 29, 2016 (14 pgs.).
European Office Action dated Jun. 2, 2020 in EP Application No. 16864711.3.
Chinese Office Action dated Mar. 17, 2020 in CN Application No. 201680065368.3.
Office Action dated Sep. 2, 2020 for Japanese Patent Application No. 2018-524402.
English-language abstract for Japanese Patent Publication No. 1-312374.
First Examination Report dated May 27, 2020 in Indian Patent Application 201817021773.

* cited by examiner

*Schematic layout and Heat Flow diagram*

*Compressor images*
Figure 3A

*Condenser images*
Figure 3B

*Throttle valve images*
Figure 3C

*Evaporator images*
Figure 3D

COLDWAVE APPLIANCE

RELATED APPLICATIONS

This application is related to and claims the benefit of International patent application Ser. No. PCT/US2016/047249 filed in the PCT Receiving Office of the United States Patent and Trademark Office on Aug. 17, 2016, which is related to, and claims the benefit of U.S. Provisional Patent Application Ser. No. 62/254,993 filed in the United States Patent and Trademark Office on Nov. 13, 2015, The full text and disclosure of both of these applications, together with their figures, technical evaluations and discussion of operational performance measurements and alternative constructions, are hereby incorporated herein in their entireties.

TECHNICAL FIELD

The present invention relates to devices and equipment for preparing beverages. It also relates to refrigeration or cooling equipment, and to an improved coffee brewing device.

SUMMARY OF THE INVENTION

The invention, referred to herein generally as the "appliance", is a beverage device characterized by possessing a powered cooling system and a contact-cooling portion having a fluid-contacting part, such as an immersed cooling coil or a cooled fluid-bounding wall or plate (a "cooling body" or "coil"), that is cooled by the powered cooling system and is configured or positioned to cool a hot beverage by thermal contact therewith. The cooling system and body are matched to and operatively coordinated with a hot beverage brewer, and the body is positioned to quickly and effectively chill a small batch, such as an individual cup, or in some embodiments a carafe, of freshly brewed or hot coffee that is passed into or run through the vessel, removing the heat of brewing, and bringing the beverage down to an icy temperature. The appliance will be described with reference to a coffee brewer, such as a 'pod-type' or 'k-cup' brewer or a filter-type drip brewer, integrated as a single unit with the refrigerant/chiller assembly and configured so that the user may select whether the beverage output of the integrated brewer/chiller appliance is to be a cup of freshly brewed hot coffee, or is to be a cup of freshly brewed and flash-chilled iced coffee. The "iced" coffee thus produced is a beverage of enhanced flavor, quickly and conveniently prepared without extended refrigeration or use of ice, and has a taste that is free of the dilution, and of the aging or oxidation, found in a conventionally-prepared iced or refrigerator-cooled beverage.

The chiller portion is preferably chilled by a robust powered cooling system such as a phase change refrigerant compression-type system that employs a positive-displacement compressor driven by an electric motor, and it is sized, in relation to its required rate of thermal cooling and to the thermal mass and conductivity of the beverage and the fluid-contacting vessel assembly, to bring a cup, or a batch, of hot coffee to an ice-cold temperature, for example, down to a temperature of about 2 to 5° C. (35-40° F.), on-demand and in a time period that is compatible with the brew time, for example, of under about two minutes, for the single cup embodiment set for a 4-, 6-, 8- or 10-ounce cup size. Preferably a selector control portion starts the refrigerant compressor when the unit is turned ON, to pre-compress a phase change refrigerant or pre-cool the cooling stage so that the initial cup of brew is flash-cooled or cooled quite quickly.

When embodied in an integrated or dual temperature (selectable hot/cold) coffee device, the heating and brewing portion or 'first stage' may follow any conventional configuration, for example may include a stage or portion substantially identical to the popular "Mr. Coffee", "Keurig" or a common bar-style Expresso brewing console. However the appliance further includes operative components such that the freshly brewed hot coffee flows in a short, or integrated or switched flow path, from the first, brewing stage portion, through a second, chiller stage portion, to an output to provide iced coffee with fresh-brewed flavor. In one integrated brewer-chiller embodiment, the brewing and chilling portions are arranged vertically, in a compact unit as upper- and lower-flow-through stages, with the chiller constructed as an evaporator coil suspended in a twist-on removable coffee-receiving vessel or cup.

The invention may also be embodied in a counter-top, chill-only appliance. The chill-only appliance may be configured with a chiller cup mounted, for example on an arm extending out from the appliance so that by moving the appliance the chiller cup is positioned on the cup- or carafe-shelf or support of a common domestic brewer. With such a construction, that is as a chill-only appliance, the chiller may be simply user-actuated with an ON switch, without specific control circuitry for coordination and integration with the brewer. More generally, however the chill-only appliance may be a counter-top chiller, a stand-alone beverage cooler that receives a 'cooling cup' or removably-positioned vessel to contain hot coffee, and the cup or vessel is held or positioned such that a refrigeration unit evaporator coil extends into the cooling cup and is surrounded by a hot beverage that is to be chilled. The cooling cup may attach by a twist-mount, bayonet or magnetic coupling to the chiller head. In one embodiment a plurality of moving vanes are positioned centrally within, or around the perimeter of, the evaporator coil and are moved by a motor or gear to deflect or stir the fluid in the vessel thereby accelerating heat removal and assuring fast and uniform cooling of the beverage while operating with a relatively modest refrigeration unit and cooling elements or vessel of modest dimensions.

In either case, whether configured to catch the output of a hot beverage brewer or configured as a free-standing chiller appliance, the refrigeration portion of the chiller assembly has a cooling capacity and thermal mass and cooling rate matched to a cup or serving of hot coffee, or to the hot fluid output of the conventional domestic or lunch-room coffee brewer, for example, to a small, medium or large coffee cup size, or in some embodiments to a small carafe batch size (e.g., 20-30 ounce size) of the brewer.

When intended as a general purpose counter-top chiller, an embodiment may advantageously be constructed with refrigeration components, such as a compressor and condenser assembly, mounted below-the-counter, connected via flexible lines or rigid tubing, to an above-counter beverage cooling head that includes an evaporator coil which extends into a removably mountable cup or vessel in which the beverage to be chilled is placed. Preferably the counter-top chiller has a small footprint, and may be similar to a soda fountain frappe machine; as such, the unit may also be used to chill other beverages, such as fruit juice, alcoholic cocktails or wine.

An embodiment of the integrated brewer-chiller appliance includes a mechanical or an electrically operated valve for selectively passing a brewed beverage stream to either a direct output (e.g., to a cup for hot coffee), or to the chilling vessel. The integrated appliance may further include control electronics that coordinate the operation of the refrigerant components with the heating/brewing cycle of the device, for example, to initially compress the refrigerant, or to pre-cool the chiller vessel or coil; or may include power control elements that vary and/or selectively switch the refrigerant compression timing and fluid flow regimens, allowing the device to flash cool at least an initial cup of hot beverage, and/or to efficiently and effectively cool a larger, e.g., carafe-sized batch of 24, 30 or 40 ounces of hot coffee, either directly (if configured with a larger vessel or refrigeration assembly), or by successively cooling several smaller cup-sized flows at controlled times or intervals as the hot beverage is being brewed. The control and switching elements may be set such that, when initially switched ON, the refrigeration components are powered; this assures that the compressor, evaporator and condenser have attained an operation-ready state when the flow of hot brewed coffee initially appears shortly after.

The invention also contemplates embodiments wherein power switching of the heater and of the compressor motor are effected under selectable or automated control at offset intervals in such a way as to limit the total power draw to below a desired peak domestic appliance power consumption level, for example to under 1200, or under 900 or under 600 watts. Such control may be programmed, and may additionally be responsive to thermal sensors that detect the initial temperatures of the vessel, the vessel contents, and/or the brew as it cools, while controlling flow valves and powering the refrigerant assembly so as to achieve fast and effective brewing and single-pass cooling without requiring extended continuous or simultaneous operation of all the power-using components, or incurring delays between the brewing and the cooling intervals. In this embodiment, the thermal mass of the cooling body or vessel, and the cooling rate or capacity of the refrigerant system may be optimized to operate effectively by partially pre-chilling the cooling body or vessel so as to brew and flash cool an initial cup, while optionally cooling the subsequent flow of coffee at a more moderate rate as it is brewed. With this arrangement the appliance flash chills a cup of coffee, but lowers the peak or duration of high electrical current draw by taking advantage of the time delays inherent in refrigerant compression and in thermal conduction profiles for contact cooling of the fluid, and the characteristic delayed water heating and hot coffee flow rate of a drip-brewing or k-cup coffee mechanism.

A presently preferred embodiment is a single cup brewer-chiller device having a brewer portion which brews hot coffee, a chiller portion to which the hot coffee may be selectively channeled to be chilled, and a flow selector or valve that either passes the hot coffee directly to an output port, or selectively diverts the hot coffee into the chiller portion before it passes to an output.

BRIEF DESCRIPTION OF THE DRAWINGS

These and other features of the invention will be understood by reference to the figures below, taken together with the description herein and the claims appended hereto, wherein:

DETAILED DESCRIPTION

Figure 1:
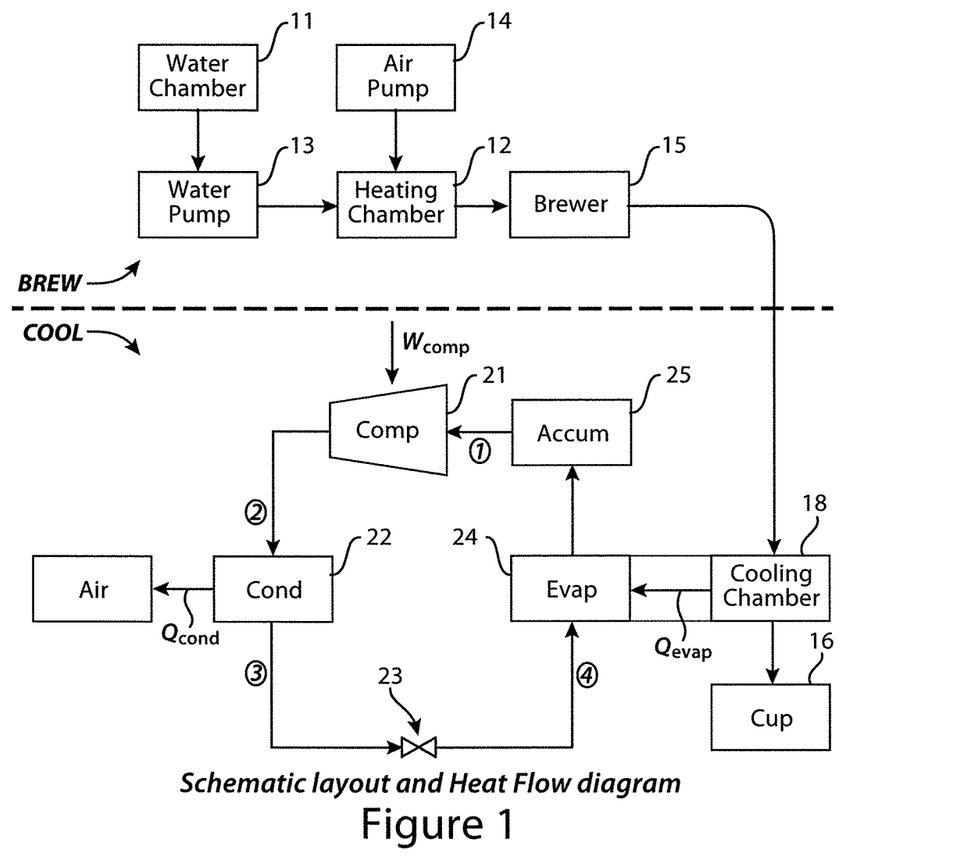
FIG. 1 schematically illustrates functional elements and organization of an embodiment of the Appliance and system flow for selectively brewing, or for brewing and chilling, coffee.

FIG. 1 schematically illustrates functional elements and organization of an embodiment of the present invention as an appliance for "brewing" instant iced coffee. Operation of the appliance involves brewing hot coffee, and chilling the beverage so produced, wherein the chilling or refrigeration components of the appliance are matched to the thermal load and brew path, being sized, positioned and operated to quickly produce a cup of iced coffee.

The upper portion of FIG. 1 shows the brewer stage of the appliance, which is illustrated as following a conventional domestic coffee brewer construction in which water is pumped from a water reservoir 11 by a pump 13 into a heating chamber 12, and the heating chamber is pressurized by an air pump 14 to force heated water along a passage into a brewer stage 15, such as a pod- or k-cup or filter cone coffee brewer, thus making hot, fresh-brewed coffee. The hot coffee so produced passes from the bottom of the brewer stage 15, either directly to a cup 16, or passes into a cooling chamber 18 which cools the coffee to form an iced coffee output. When the user has selected "hot" coffee, the brew may follow a flow path centrally through the cooling chamber, without contacting the cooling element. Such an arrangement is discussed further below, and illustrated in FIGS. 5-8.

The lower portion of FIG. 1 schematically illustrates arrangement of the refrigeration components of the appliance, and their interface with the hot coffee brewer stage, and operation to cool an evaporator coil. For producing iced coffee, the refrigeration portion and the brewer portion of the appliance overlap in the cooling chamber 18, in which coffee from the brewer stage 15 is retained and contacts the evaporator coil during a cooling interval. When a hot coffee output is selected, the cooling chamber is simply bypassed. As shown in FIG. 1, the refrigeration portion of the appliance may include a phase change refrigeration compressor 21, which compresses and drives a refrigerant into a condenser 22. The condenser may be cooled by a fan or an array of fans to better dissipate the heat of condensation or compression, denoted Qcond in the figure. From the condenser, the refrigerant expands through a throttle valve 23 entering the evaporator coil 24 as a further-cooled fluid. The evaporator coil 24 is positioned in the cooling chamber 18 to cool the hot coffee output of the brewer by contact, absorbing heat, denoted Qevap, from the beverage. The refrigerant then passes to an accumulator 25 before entering the compressor 21 for the next compression cycle. The state of the refrigeration fluid changes at the various points of the refrigerant cycle in FIG. 1, starting from state 1 entering the compressor, to a compressed but heated state 2 entering the condenser, where heat is rejected to reach state 3, then expanding and cooling as it passes through the throttle valve 23 and attains state 4 entering the evaporator as a cooled heat exchange medium for absorbing heat from the beverage before again returning to state 1 in the accumulator ready for the next compression cycle.

Figure 2:
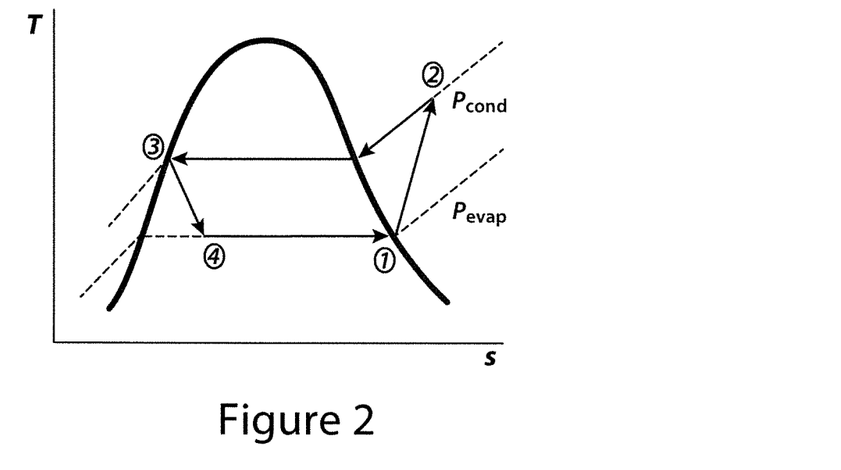
FIG. 2 shows idealized states of a heat transfer refrigerant on a temperature-entropy diagram of the beverage cooler.

FIG. 2 shows the Temperature-entropy diagram corresponding to states 1-4, illustrating the work performed in compressing the refrigerant and in cooling the hot coffee.

By way of background and technical detail, applicant notes that this application is based upon and related to the U.S. Provisional Patent Application Ser. No. 62/254,993 filed in the United States Patent Office on Nov. 13, 2015, cited supra and incorporated by reference herein in its entirety. That provisional filing described theory and operational characteristics of prototype a domestic iced coffee appliances with a refrigerant portion matched to a brewer so as to effectively make instant iced coffee, and reported investigating the heat exchange effectiveness and the actual or characteristic beverage cooling times of several configurations of cooling elements as described therein, including fluid cooling with a refrigerant compressor driving an evaporation coil or a cooled plate; and the rate of cooling of the coffee as affected by several different fluid mixing or stirring regimens. The provisional patent application also suggested arrangements for a free-standing chiller, for an integrated brewer-chiller, and for improved implementations of an iced coffee appliance modeled on a single-portion k-cup brewer or modeled on a pitcher-size drip brewer. The reader is urged to consult the full text and disclosure of that application, together with its figures, analytic models and technical evaluations and alternative constructions, for descriptions of technology for effective implementation of the beverage cooler, and relevant factors and general considerations, including theory, hardware, applications, and various test procedures or results illustrating intended and desirable embodiments and elucidation of technical factors defining the nature and scope, capacity and operating characteristics achieved by or achievable in embodiments of the invention.

As relevant hereto, applicant found that chilling times of well under several minutes are achieved using a small (fractional horsepower, under 500 watt) refrigeration compressor, and that chilling is enhanced by providing a stirring or mixing mechanism in the cooling chamber 18 to improve the rate of heat exchange and uniformity of cooling, and avoid the formation of ice on the evaporator coil. These thermal calculations and proof-of-principle experiments were performed by adapting components with a modified refrigeration cycle and a custom evaporator in thermal contact with a receiving vessel or chamber sized for effective heat exchange contact with a cup or batch of hot coffee. The experiments identified and confirmed achievable target power usage of under about a kilowatt for the combined heating and cooling requirements, and achieving cooling times under two minutes, and suitable dimensions and materials for components of a cup- or carafe-sized on-demand coffee chiller. The size and scale are such that embodiments of the chiller assembly may be integrated with the switching, fluid heating, and fluid-channeling components of a conventional coffee maker, and matched to the thermal load of the coffee maker, to form an integral coffee brewer-chiller-dispenser of enhanced performance that selectively provides hot coffee or ice-cold coffee on demand in a counter-top appliance for domestic use.

As such, the dimensions, power and thermal characteristics fall in a low range and are engineered to collectively achieve fast and effective cooling of the hot beverage. In addition, because the Appliance includes a compressor powering a refrigerant-based cooling cycle, in some embodiments it may also be run in a continuous, or near continuous cooling mode (for example under control to achieve or maintain a specific operating temperature) and operated to successively cool an unlimited number of cups of hot coffee, or more slowly cool a larger volume provided over a longer time. Such an embodiment of the integrated Appliance is thus adapted for large functions or events and the invention is not limited to typical domestic or small office lunchroom situations.

From a high level systems view, the basic function of the device is to actively cool a small batch of a liquid rapidly, without dilution, on demand. More specifically, for brewing a hot beverage such as tea or coffee; the Appliance brews and then cools the beverage from "near boiling" to "ice cold"; and cooling is effected in a short time interval, comparable to the brew time of a common single-serving domestic brewer. Illustratively, a coffee cooling temperature drop of over 150° F. is effected in an operating time of under one or two minutes. By arranging the cooling elements around the periphery of the cooling vessel, the device may be configured so that when hot coffee is desired, a manual selector allows the brew stream to simply pass centrally through the cooling vessel, without loss of heat. Embodiments of the integrated brew/chill Appliance may also be configured with a sensor to sense the temperature of the cooled liquid and/or a control circuit to control coolant cycles or to divert fluid flow along separate 'hot' or 'chilled' paths to a receiving cup accordingly. In some embodiments, controlling on the output temperature, or both input and output temperatures, the Appliance may be configured as a chiller only, and operated to chill other beverages, such as alcohol-based cocktails, from a less extreme initial temperature, e.g., from room- or wine-cellar temperature, to a chilled or near freezing temperature.

The structure of the Appliance will be best understood starting with a description of an illustrative embodiment as a counter-top single serving coffee cooling appliance.

From a process flow perspective, a refrigeration cycle is integrated with a batch cooling container or receiving vessel. The refrigerant evaporator may comprise a helical coil sitting in the vessel chamber, or tube embedded in a wall of the vessel, and is positioned to remove heat from (i.e., to cool) the beverage in the receiving vessel. The beverage is automatically channeled into the container, or in some embodiments is poured (by hand), and is held for the cooling duration, and is then exited, for example, via a manually-operated spigot, via an automatically switched valve at the bottom of the vessel, or by removing the vessel and decanting the chilled beverage. The filling, cooling, and pour functions are preferably coordinated by a logic board which actuates the compressor/refrigeration components and the appropriate valves in the fluid path. A temperature sensor may detect the desired thermal endpoint (e.g., 35° F.) and turn off the compressor, open an output valve, and/or initiate a new fill/cool cycle.

As shown in the lower portion of FIG. 1, refrigeration hardware may include a compressor, condenser, throttle valve, and accumulator, examples of which are shown in FIGS. 3A, 3B, 3C and 3D. This hardware is similar to that of a standard small refrigerator or a room air-conditioner construction, but may be specifically scaled and adapted to the task of quickly cooling a cup or batch of the hot beverage. An evaporator is preferably provided as a custom coil fitted within the vessel, and may be a helix, a double helix or other shape, or a plate cooled by refrigerant tubes, incorporated with the beverage container for effective cooling. A single helical coil positioned within a cylindrical cooling vessel has been found to be effective. Preferably a mixing mechanism is also provided to hasten heat exchange between the hot beverage and the fluid-contacting surface of the evaporator assembly in the cooling vessel. Mixing increases the rate of heat transfer, especially at moderate or intermediate temperatures.

Two mixing mechanisms have been found to perform well—blade mixing (e.g., stirring) and bubble mixing. These may be implemented with a rotary stirrer powered by a small drive extending down into the fluid, or a diaphragm-type air pump, respectively which provides a stream of air to churn the fluid. Blade mixing (e.g., with an assembly of moving vanes) is preferred to avoid possible oxidation or flocculation effects that might occur from a bubble mixer with some brews. The benefits of mixing include increasing the heat transfer coefficient; decreasing the required surface area of the evaporator element, cooling member or vessel; and avoiding the formation of ice on the evaporator coil.

In a hot/cold coffee brewing Appliance, the coffee brew portion of the appliance can employ the construction of an existing brewer of the prior art; however the cooling technology, and the integration of the coffee components with the cooling components, is believed to be new and inventive. The discussion below for FIGS. 5-8 illustrates one basic integrated brewer/cooler device.

As a general beverage cooler, the Appliance may be implemented as a stand-alone device rather than as a stage in a brewing device, to enable the user to chill or process any beverage. However, to integrate the technology into a single cup brewer, preferentially with k-cups or other single-cup coffee product, the Appliance is preferably configured with a rotary-type refrigerant compressor to achieve a suitably narrow footprint, and with a controller card and user control buttons, switches and fluid valves to control the refrigeration components and fluid paths so as to augment a conventional brewing device to provide the option to serve hot coffee as usual or ice coffee that is "brewed hot, served cold." Applicant has found that integrating the brewing and cooling operations in this manner results in an iced coffee product having exceptional flavor and freshness. A simple spring-loaded valve in the brew head may provide dependable, single-slide user operation without requiring complex electronics or control circuitry.

Operation of the appliance will be understood with reference to the thermal characteristics of its basic operation, involving a refrigerant-based cooling module that cools a coffee-receiving cooling vessel and sized for counter-top operation. FIG. 1 schematically illustrates functional elements of an embodiment of the appliance and their system flow diagram, while FIG. 2 shows the corresponding idealized states (at an instant in time) on a T-s (temperature-entropy) diagram. As shown in the left side of FIG. 1, refrigerant starts as a saturated vapor in state 1 and passes through a compressor attaining a compressed state 2 or condenser pressure at a higher temperature. In the condenser coil, the heat of compression is rejected from the refrigerant with a heat flow $Q_{cond}$ from the condenser into the surrounding air lowering the temperature of the compressed refrigerant at state 3. A fan or array of small fans directed at the condenser is provided in some embodiments to provide air circulation and assure sufficient heat transfer to avoid overheating of the condenser. From state 3 the compressed refrigerant passes through a throttle valve, which regulates flow of the cooled compressed refrigerant to a state 4 that then passes into the evaporator coil. As shown in FIG. 1, the evaporator coil is placed in heat exchange position with, or is positioned within, a beverage vessel where it cools the beverage by absorbing a flow of heat $Q_{evap}$ from the beverage into the refrigerant fluid, which expands or evaporates and passes to the accumulator whence it again passes into the compressor stage. Thus, from state 4 to 1, heat is transferred in the evaporator from a hot beverage into the refrigerant which then passes to another compression/refrigeration cycle. The accumulator is positioned to prevent liquid from entering the compressor. In FIG. 1, the beverage vessel is illustrated schematically on the right side of the Figure, corresponding to the output of a coffee brewer, in practice the evaporator coil may be integrated with a coffee brewing device, and the vessel may a bayonet-mount coffee-receiving cup that fits around the evaporator and causes coffee to accumulate and rise up and immerse the evaporator in hot coffee. The temperature-entropy diagram of FIG. 2 illustrates states (1)-(4) described above. In practice a suitable refrigeration assembly operating with a 300 to 500 watt motor has been found sufficient for effective operation of the described domestic coffee chiller.

Hardware components or subsystems of the cooling portion may be adapted from or similar to corresponding portions of common consumer products such as a small room air conditioner or a personal dormitory-style refrigerator. Typical components of this type are illustrated in FIG. 3A-3D with discussion of some attributes for technical consideration. The hardware elements (compressor, condenser coil, evaporator coil) are sized and shaped to fit the overall volume, and in certain embodiments designed to constitute a pleasing design or stylized shape, of a counter-top appliance. Thus, for example, the motor and compressor may form a cylindrical functional unit about 10-12 cm in diameter by 25-30 cm tall; the condenser coil may constitute a rectangular planar array about 20 by 30 cm positioned on a rear face of the appliance and cooled by a fan or an array of small fan units, and the evaporator path may consist of a helical tube that is positioned for immersion in a cup-shaped chamber or vessel that fits in a lower part of the brew/drip path and receives the hot beverage.

Figure 3A:
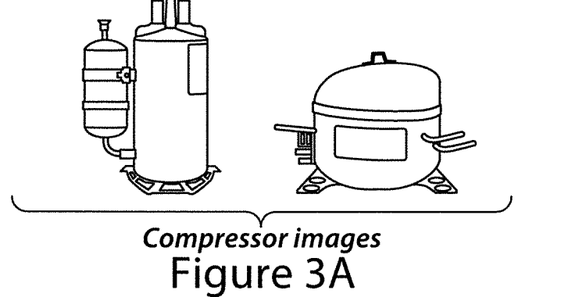
FIGS. 3A, 3B, 3C and 3D show, by way of example, compressor, condenser, throttle valve and evaporator elements useful in a refrigerant assembly of the chiller appliance.

FIG. 3A shows several compressor options, which may include rotary (left image) and reciprocating (right image) compressor mechanisms. Both are positive displacement compressors, which operate efficiently for low refrigerant flow applications, and both are commonly used in air conditioning and refrigeration applications. The rotary compressor may include a liquid accumulator, as shown on the far left in FIG. 3A, which assures that liquid does not enter the compressor stage. From a performance standpoint, both compressors are sufficient, and the choice of a compressor for incorporation in the appliance may be driven by cost and layout considerations. For bread boarding and the initial thermal analysis, a rotary-type compressor from a 5,000 BTU air conditioner manufactured by the LG corporation was employed, with a reduced-size condenser and evaporator configured for effective cooling and interfacing with a single-cup brewer or manually-poured hot coffee.

The appliance is to occupy a countertop footprint similar to that of a popular domestic coffee brewer, and may, like them, include a programmable control chip which, may operate for setting such features as initiation of the coffee brewing operation, as well as operations unique to the appliance, such as initiation of a cooling and/or a precooling operation of the compressor, cooling of the hot coffee, end of the cooling cycle, and, in some embodiments, automatic passage of the cooled beverage to an output port or receiving cup. The illustrated rotary compressor suggests a size and overall shape similar to a domestic coffee brewer such as a Keurig- or a CoffeeMate brewer, and this overall look was selected for prototype construction.

Figure 3B:
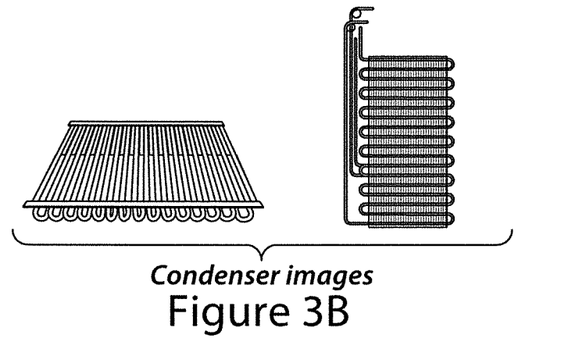

Various options may be implemented for forming the condenser portion of the refrigerant module. FIG. 3B illustrates several possible condenser constructions. The left side shows a tube and fin arrangement common to forced convection (fan driven) air conditioners, and the right shows a natural convection type commonly found, for example, in a low power or continuously-operating refrigerator. It was decided to use a forced convection type condenser coil to achieve a compact and inexpensive counter-top appliance.

Figure 3C:
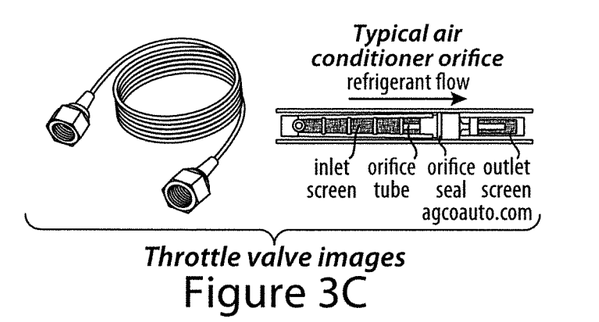

FIG. 3C shows several simple throttle valve constructions. The left side shows a capillary tube, while the right side image illustrates a pressure or flow reduction orifice. A variable area valve was not considered for the sake of cost and minimal controls, because the magnitude of the cooling task for the intended beverage size and known starting temperature allows clear definition of a fixed throttle valve. A capillary tube is chosen because it is less sensitive to disturbances in the line and has been found to be effective and commonly used in comparable cooling applications such as air conditioners.

Figure 3D:
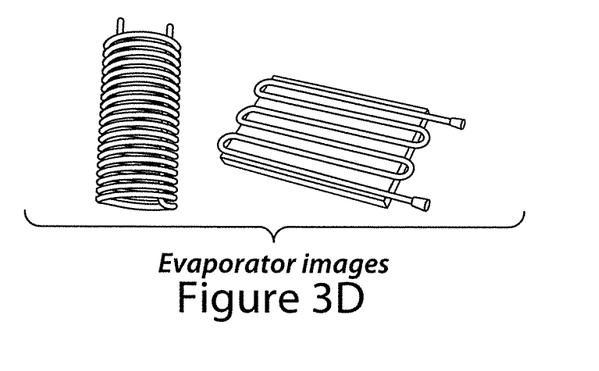

FIG. 3D illustrates several possible implementations of the evaporator. The left side shows a bare helically-shaped tube for immersion in the beverage. The right side shows a cold plate type heat exchanger wherein intermediate material is used to provide a flat beverage interface. The use of a cold plate construction would increase cost and potentially introduce thermal resistance, in particular relative to any air gaps (even small gaps on the order of 0.001 in) that may exist between the refrigerant line and the plate surface, while cleanability would be a potential trade-off when using an elongated or a double-helical spiral evaporator coil. However the components of brewed coffee, if they adhere to or build up on the heat exchange contact surface, constitute at worst a cosmetic, rather than a bacteriological, residue, so that performance considerations of cooling efficacy make the bare coil evaporator the first choice for implementation of the appliance.

In embodiments of the beverage-cooling appliance, a mixing mechanism is desirably also provided for the evaporator/cooling vessel in order to enhance heat transfer between the evaporator and the surrounding fluid, and to reduce the required surface area and therefore size, and to prevent ice formation as the fluid contacts the evaporator. Two mechanisms were considered: (1) a motor driven blade, paddle, whisk or propeller for stirring the fluid, and (2) an air compressor driven aerator/bubbler, which may be similar to one used in a fish tank, or comparable in pressure to the aerator of a latte machine.

Several refrigerants were considered, including R134a and R410a. R134a is currently more commonly used in residential applications, but the fluorocarbon mixture R410a appears to result in better performance and, for environmental reasons, is likely to be phased in as the dominant player in residential applications. For these reasons, R410a is presently preferred for the appliance.

Thermal modeling was performed for the process of cooling, roughly contemplating cooling a 12 oz cup of coffee from 200 OF down to 35° F. in 2 minutes. The time averaged evaporator heat transfer from the coffee to the refrigerant is $$\dot{Q}_{evap} = \frac{mc_p \Delta T}{t}$$

$$\Rightarrow \dot{Q}_{evap} = \frac{\left(\frac{12}{16} lbm\right)\left(4200 \frac{J}{kg\,K}\right)(200-35)R}{(2\,min)\left(\frac{60\,s}{min}\right)\left(\frac{2.2\,lbm}{kg}\right)\left(\frac{1.8\,R}{K}\right)} = 1091\ W$$

Assuming a refrigeration coefficient of performance of 3, the compressor power is given by $$COP = \frac{\dot{Q}_{evap}}{\dot{W}_{comp}}$$

$$\Rightarrow \dot{W}_{comp} = \frac{\dot{Q}_{evap}}{(COP)} = \frac{(1091\ W)}{(3)} = 364\ W$$

An energy balance gives the heat rejection in the condenser from the refrigerant to the air $$\dot{Q}_{cond} = \dot{Q}_{evap} + \dot{W}_{comp}$$

$$\Rightarrow \dot{Q}_{cond} = (1091\ W) + (364\ W) = 1455\ W$$

In terms of the heat exchanger, the evaporator heat transfer is given by $$\dot{Q}_{evap} = U_{evap} A_{evap} \Delta T_{evap}$$

where $U_{evap}$ is the overall heat transfer coefficient, $A_{evap}$ is the coffee/heat exchanger interface surface area, and $\Delta T_{evap}$ is the temperature difference between the coffee and the refrigerant. Assuming an overall heat transfer coefficient of 1000 W/m2/K (forced convection, water) and a temperature difference of 60 F, the heat transfer surface area is $$A_{evap} = \frac{\dot{Q}_{evap}}{U_{evap} \Delta T_{evap}}$$

$$\Rightarrow A_{evap} = \frac{(1091\ W)\left(\frac{3.28\ ft}{m}\right)^2}{\left(1000 \frac{W}{m^2 K}\right)(60\ R)\left(\frac{K}{1.8\,R}\right)} = 0.35\ ft^2$$

Similarly for the condenser, assuming 100 W/m/K (forced convection, air) and a temperature difference of 20° F.

$$A_{cond} = \frac{\dot{Q}_{cond}}{U_{cond} \Delta T_{cond}}$$

$$\Rightarrow A_{cond} = \frac{(1455\ W)\left(\frac{3.28\ ft}{m}\right)^2}{\left(100 \frac{W}{m^2 K}\right)(20\ R)\left(\frac{K}{1.8\,R}\right)} = 14\ ft^2$$

The compressor and throttle valve can be sourced using conventional refrigeration part specifications for the cooling load above. Rough specs for the compressor are: a volume flowrate of 0.5 to 1.0 cfm and a pressure rise of 100 to 200 psi, depending on the refrigerant type. Rough specs for the throttle valve are: a capillary tube 0.040 to 0.050 in ID and a tube length of 2 to 3 feet. The performance calculations above are time averaged rough estimates. Refined optimization is achieved with detailed analysis and hardware testing; however, illustratively, a brief summary of several test procedures is included herein.

For confirmation of modeling, a 5000 BTU/hr window air conditioner (R410a) was deconstructed and substituted with a suitably-sized evaporator heat exchanger. Performance levels were reported in the aforesaid provisional patent filing, and a decision was made to proceed with a helical evaporator coil for initial product design. Testing further showed that mixing was effective to prevent ice formation on the coil. Measurements were taken during a number of mixing runs.

Figure 4:
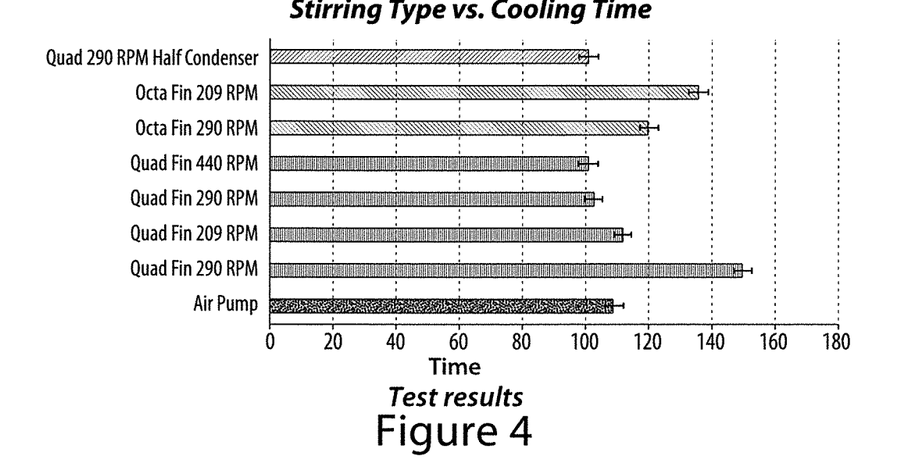
FIG. 4 shows measured cooling times achieved with several mixer and condenser variations during testing and validation of integrated chiller constructions.

FIG. 4 shows a subset of the cooling run test results for several prototype mixer and evaporator variations. The beverage temperature change was roughly from 200 down to 40° F. The calculations showed that the condenser was oversized by a factor of about 2× for the desired level of performance, and this was subsequently verified in tests. A four blade mixer performed better than an eight-bladed one, and diminishing returns were shown with respect to speed, illustrating that only a moderate speed would be needed. Interestingly, air mixing was found to be comparable to blade mixing, so the choice between air vs blade mixing may be considered open for final appliance product designs provided no adverse taste or textures are introduced by aeration. A paddle-wheel vane arrangement rotating around the coil periphery is also deemed suitable. The prototyping tests, using compressor, condenser, throttle valve, and accumulator hardware that are standard refrigeration components, and an evaporator that, while a custom coil, was a helix of relatively standard shape, fully confirmed and enabled construction of integrated or free-standing coffee coolers with on-demand batch cooling performance. The helical evaporator coil in a cylindrical beverage cooling vessel quickly and efficiently performed on-demand and fast cooling, while the addition of any of several different mixing mechanisms—blade mixing and bubble mixing—enhanced performance and prevented icing of the coil, demonstrating an ability to operate continuously on successive batch cooling tasks to handle cumulatively large tasks such as event catering which may require individual serving on a possibly repetitive basis. As noted above, other benefits of mixing in addition to preventing ice formation on the coil include increasing the heat transfer coefficient and decreasing the surface area requirements, thus removing space and weight constraints on the design and visual appearance of consoles or units embodying the appliance.

Figure 5A:
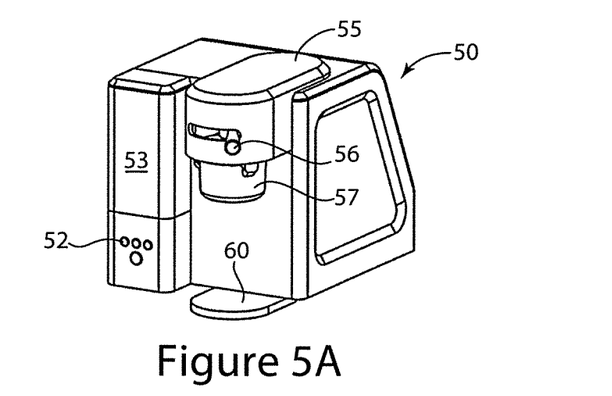
FIGS. 5A and 5B show right- and left-front perspective views of an integrated domestic brewer/chiller appliance.
Figure 5B:
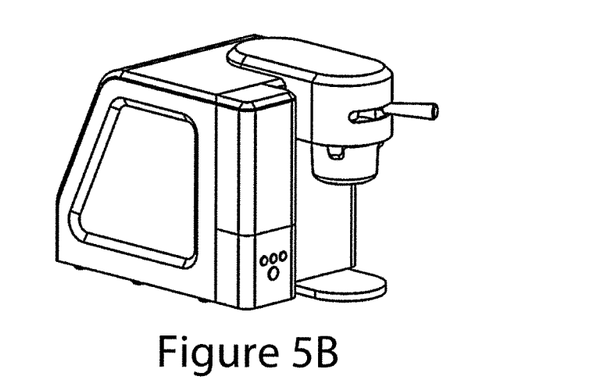

FIGS. 5A and 5B illustrate the integrated brewer/icer of the invention as embodied in a pod brewer 50, showing perspective views from the front right (FIG. 5A) and front left (FIG. 5B). The appliance has a control panel 52 which may include one or more suitably wired button switches for ON, OFF, COLD or STANDBY, and one or more LED status indicator lights to report a status such as READY or BREWED. A user-filled water reservoir 53 occupies the left side of the appliance, while the right side consists of a pod- or filter-type brewer head 55 which notably includes a hot/cold selector handle 56 at the level of the pod or filter (discussed further in relation to FIGS. 7A and 7B infra, and a chiller cup or vessel assembly 57 located vertically below the brew pod and above the drip tray 60.

Figure 6A:
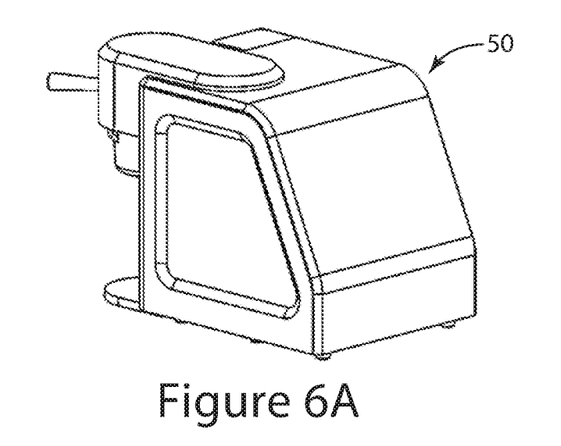
FIGS. 6A, 6B and 6C show left-rear perspective views of the appliance of FIG. 5 illustrating integration of refrigeration elements into a coffee brewer.
Figure 6B:
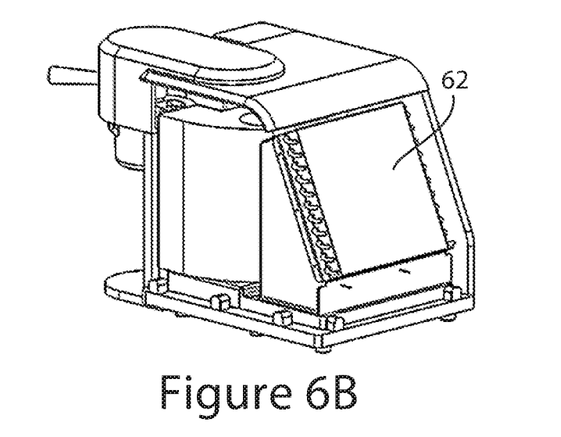
Figure 6C:
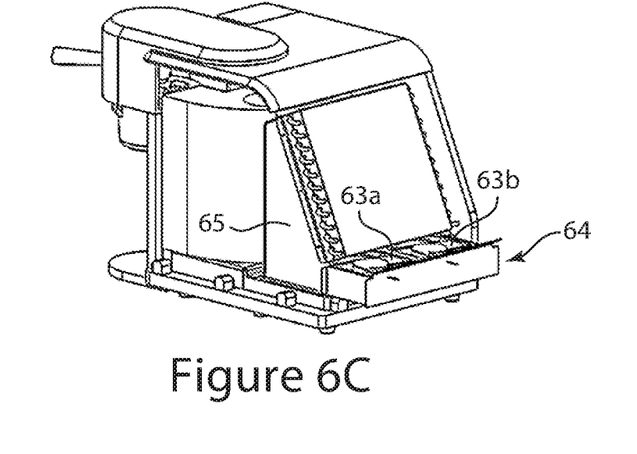

FIGS. 6A, 6B and 6C are perspective views from the back and left of the integrated appliance 50 showing details of refrigerant unit integration. The condenser coil assembly 62 is mounted on a rear surface of the appliance 50 under a cover plate that serves to channel cooling air provided by fans 63a, 63b (positioned in a fan tray 64 below the condenser coil 62) through the cooling tower or air duct 65 forming a rear portion of the body of the appliance. This arrangement provides degree of thermal isolation between the refrigerant heat dissipation elements and the cooling vessel while improving the overall cooling capacity of the small refrigeration assembly.

Figure 7A:
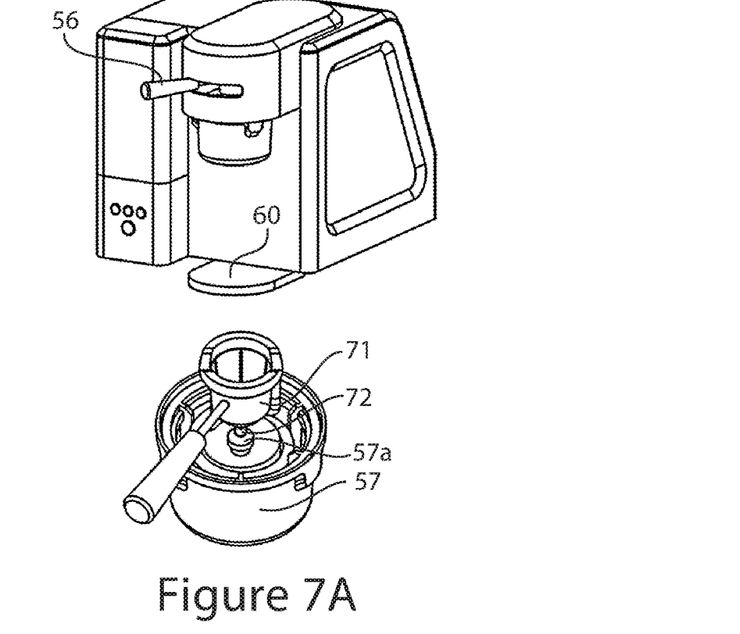
FIGS. 7A and 7B illustrate operation of hot (FIG. 7A) and cold (FIG. 7B) beverage selection mechanism.
Figure 7B:
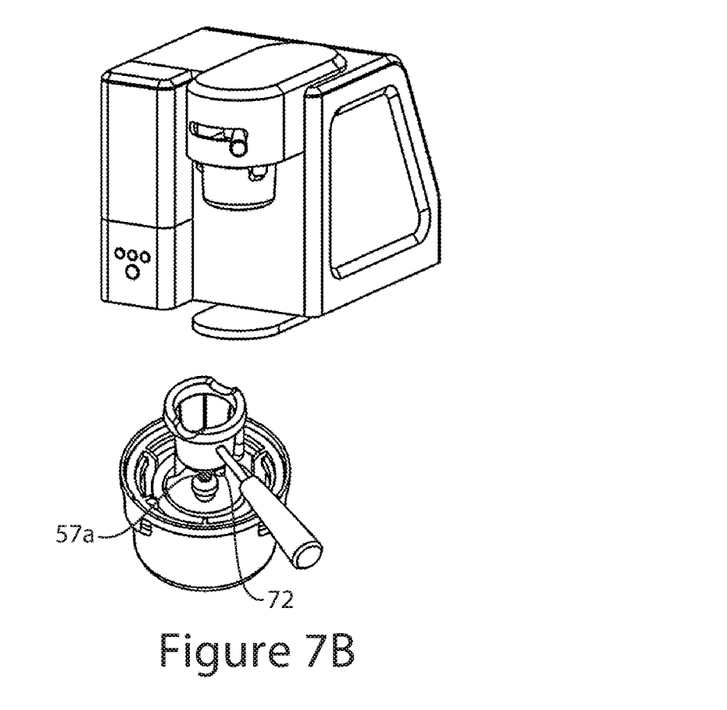

Returning to a front perspective view, FIGS. 7A and 7B illustrate details of the brew basket assembly and operation with the hot/cold selector handle 56 and cooling vessel 57 of Figure SA. FIG. 7A shows the hot/cold selector in the HOT position, with the corresponding position of the brew basket 71 and cooling vessel 57 shown in the lower portion of FIG. 7A. In this position, the outlet passage 72 at the bottom of the brew basket 71 directly enters a central outlet passage 57a of the vessel 57, allowing the hot coffee to pass without contacting the evaporator coil 80 (FIGS. 8B-8D) that is positioned circumferentially around the central region, and to fall straight through into a coffee cup resting on the drip tray 60. FIG. 7B shows corresponding views when the selector handle 56 is moved to the right into the COLD or ICED COFFEE position. This motion moves the brew basket outlet passage 72 off center, so it is no longer aligned with the central hot coffee outlet 57a, thus causing the hot brew to flow into and fill the cooling vessel, contacting the evaporator coil and chilling the coffee.

Figure 8A:
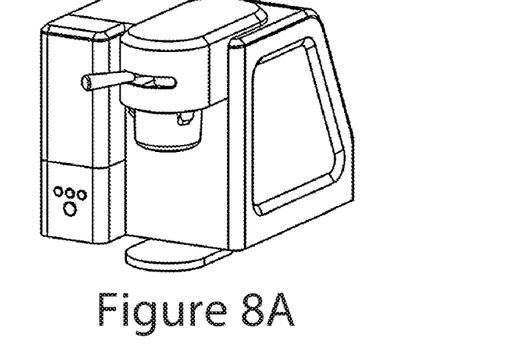
FIGS. 8A, 8B, 8C, and 8D further illustrate construction details of a selectable chilling cup of the appliance of FIGS. 5-7.
Figure 8B:
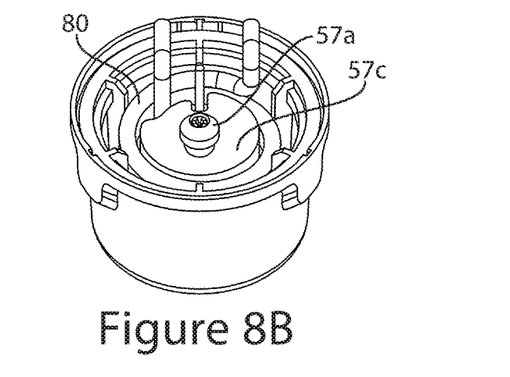
Figure 8C:
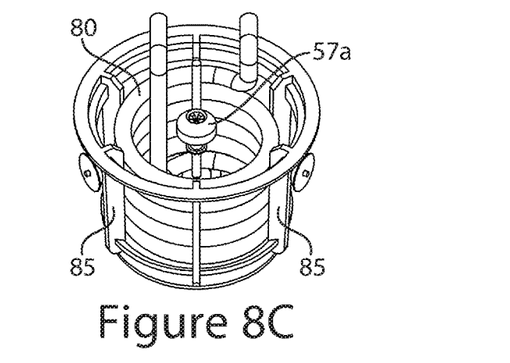
Figure 8D:
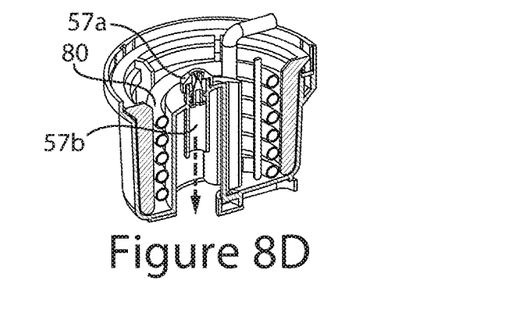

FIGS. 8A-8D illustrate further details of the cooling vessel and evaporator coil for such operation. As shown, the evaporator coil 80 fills a generally peripheral region, while the hot coffee through passage 57a is located near the center and positioned to align with the brew basket outlet 72 (FIG. 7A). As best seen in FIG. 8D, the hot bypass passage 57a which may have a contact valve at its top surface to close when not directly contacted by the brew basket outlet 72, leads into an open bypass conduit 57b which keeps the hot flow away from the nearby evaporator coil and allows the hot brew to bypass the chilling cup and drop straight through to the user's cup. However when the brew basket outlet 72 is not aligned with the passage 57a, 57b the hot coffee falls on top plate 57c and runs off to the side or peripheral region, flowing down over the evaporator coil so that the beverage is cooled. With this arrangement, the helical evaporator coil may be positioned in a narrow or closely fitting annular region between the central body and the outer wall of the vessel to assure speed and efficiency of cooling. As best seen in FIG. 8C, the evaporator assembly or the vessel may further include a circumferentially mounted set of oblique vanes 85. These may be driven by a motor or drive gear in a paddle-wheel motion to deflect or drive the hot liquid radially through the evaporator coil to enhance the rate of cooling of the coffee pooled in the annular region of the chilling cup surrounding the evaporator coil. Positioning the coil in an annular vessel rather than an open cup assures a substantial degree of immersion of the coil for effective heat transfer and cooling without introducing localized ice bridging or thermal non-uniformity.

While FIGS. 7 and 8 illustrate a specific arrangement of brew basket and chilling vessel passages for achieving bypass or cooling operation without electrically-operated valves, it will be appreciated that the illustrated manually-operated selector mechanism is readily adaptable to various common brew baskets of pod-, k-cup-, filter- or expresso-type coffee machines, and further that such mechanical flow-selectors may instead be effected by push-button, electrically operated valve, selector, and/or pump mechanisms. Moreover mixing may, in various embodiments be implemented by various paddle or whisk- or propeller-type stirring, or flow deflection or recirculation mechanisms in the cooling vessel to drive the coffee against the evaporator coil for fast efficient heat transfer without icing up. It will be understood by a person skilled in the art that the layout of elements may be varied accordingly when the cooling mechanism is to be integrated with, or manually positioned under a hot coffee brewer of different overall shape, size or aspect.

Furthermore, architecture of the brew section may also be varied within a broad range of constructions. Thus, for example, while conventional k-cup or pod-type or other brewers commonly have a top lid that lifts up slightly for insertion of the cup or pod, or for placement of coffee and a drip filter, brew heads of the present invention may be configured with a drawer mechanism that pulls forward to allow insertion of the coffee charge, thereby reducing the required vertical clearance for counter top operation. In a drawer-type embodiment, the hot/cold coffee paths may also be implemented differently, for example, may correspond to different drawer positions, which operate to position the coffee charge over different passages for direct output or diversion to the evaporator cooler. It will also be appreciated that while the embodiment of FIG. 6 generally places the heat rejection condenser on a broad back surface of the appliance, and augments its efficiency by a forced air channeling fan assembly, condenser positions at either side are also feasible, and passive airflow can suffice when an appliance is intended for occasional, single-cup or low volume operation rather than broader household or café use. Other variations may incorporate, start from or coordinate with different existing brew mechanisms of the prior art, and may substitute steam pressure for motorized pumping, electrically operated valves rather than the described manual selector for directing either water or brewed coffee along different paths, and chiller vessels differently positioned in relation to the brew assembly.

The invention being thus disclosed and representative embodiments described, further variations and modifications will occur to those skilled in the art, and all such variations and embodiments are considered to be encompassed in the invention, as set forth herein and the claims appended hereto.

The invention claimed is:

1. An apparatus, comprising:
a powered cooling assembly comprising a compressor, a condenser, and an evaporator for compressing and circulating a phase change refrigerant to provide selective cooling localized at the evaporator, the evaporator comprising a tube having an inner surface that defines a passageway for the phase change refrigerant along a length of the tube and an outer surface that is generally concentric with the inner surface along the length of the tube, wherein the tube forms a helical evaporator coil;
a beverage brewer configured to produce a brewed beverage in excess of 150 degrees Fahrenheit;
a cooling chamber configured and arranged to receive and retain a batch of the brewed beverage from the beverage brewer during a cooling interval, at least a portion of the tube being positioned within the cooling chamber; and
a mixer disposed within the cooling chamber, the mixer including at least one blade configured and arranged to move within a central portion or around a perimeter of the helical evaporator coil so as to drive the brewed beverage radially against loops of the helical evaporator coil;
wherein the beverage brewer is configured and arranged to bring the brewed beverage in excess of 150 degrees Fahrenheit into direct contact with at least a portion of the outer surface of the tube.

2. The apparatus of claim 1, further comprising a control for selectively providing a hot or a chilled beverage at an output of the apparatus, wherein the control passes hot coffee through the cooling chamber without contacting the portion of the tube when a hot beverage is selected.

3. The apparatus of claim 1, further comprising:
a control circuit configured to control operation of the powered cooling assembly and the beverage brewer so that the powered cooling assembly provides the selective cooling localized at the evaporator while the beverage brewer is brewing the brewed beverage and dispensing the brewed beverage into the cooling chamber.

4. The apparatus of claim 1, further comprising a forced air driver for removing heat from the condenser.

5. The apparatus of claim 1, wherein the beverage brewer comprises a coffee brewer.

6. The apparatus of claim 1, wherein the helical evaporator coil is shaped as a double helix.

7. A method for producing a beverage product using a powered cooling assembly comprising a compressor, a condenser and an evaporator for compressing and circulating a phase change refrigerant to provide selective cooling localized at the evaporator, the evaporator comprising a tube having an inner surface that defines a passageway for the phase change refrigerant along a length of the tube and an outer surface that is generally concentric with the inner surface along the length of the tube, wherein the tube forms a helical evaporator coil, the method comprising:
introducing a batch of a beverage in excess of 150 degrees Fahrenheit into a cooling chamber in which at least a portion of the tube is disposed so as to cause the beverage to directly contact at least a portion of the outer surface of the tube of the evaporator during a cooling interval to produce the beverage product; and
operating a mixer disposed within the cooling chamber so that at least one blade of the mixer moves within a central portion or around a perimeter of the helical evaporator coil so as to drive the beverage radially against loops of the helical evaporator coil.

8. The method of claim 7, wherein the beverage comprises freshly-brewed coffee or tea.

9. The method of claim 7, wherein the beverage comprises freshly-brewed coffee.

10. The method of claim 7, wherein introducing the batch of the beverage into the cooling chamber further comprises:
causing the beverage to fully encircle a circumference of the portion of the tube during the cooling interval.

11. The method of claim 7, wherein introducing the batch of the beverage into the cooling chamber further comprises:
retaining the batch of the beverage within the cooling chamber during the cooling interval so that the portion of the tube remains fully immersed within the batch of the beverage during the cooling interval.

12. The method of claim 7, wherein introducing the batch of the beverage into the cooling chamber further comprises:
retaining the batch of the beverage within the cooling chamber during the cooling interval so that a helically-configured section of the tube remains fully immersed within the batch of the beverage during the cooling interval.

13. The method of claim 7, wherein the beverage comprises freshly-brewed coffee or tea, and the method further comprises:

controlling operation of the powered cooling assembly and a beverage brewer so that the powered cooling assembly provides the selective cooling localized at the evaporator while the beverage brewer is brewing the coffee or tea and dispensing the coffee or tea into the cooling chamber.

14. The method of claim 7, wherein the helical evaporator coil is shaped as a double helix.

15. The method of claim 7, wherein operating the mixer comprises moving the at least one blade within the central portion of the helical evaporator coil.

16. The method of claim 15, wherein the at least one blade comprises a plurality of vanes that extend vertically through at least part of the central portion of the helical evaporator coil.

17. The method of claim 7, wherein operating the mixer comprises moving the at least one blade around the perimeter of the helical evaporator coil.

18. The method of claim 17, wherein the at least one blade comprises a plurality of vanes configured and arranged to move circumferentially about helical evaporator coil.

19. The method of claim 7, wherein a ratio of a heat transfer surface area of the helical evaporator coil to a volume of the cooling chamber is at least 0.02916 square feet per fluid ounce.

20. The method of claim 7, wherein operating the mixer comprises rotating the at least one blade at 290 or more revolutions per minute.

21. The method of claim 20, wherein operating the mixer comprises rotating the at least one blade at 440 or fewer revolutions per minute.

22. The method of claim 7, wherein a ratio of a heat transfer surface area of the helical evaporator coil to a power consumed by the compressor is at least 0.00096 square feet per Watt.

23. The apparatus of claim 1, wherein the at least one blade is configured and arranged to move within the central portion of the helical evaporator coil.

24. The apparatus of claim 23, wherein the at least one blade comprises a plurality of vanes that extend vertically through at least part of the central portion of the helical evaporator coil.

25. The apparatus of claim 1, wherein the at least one blade is configured and arranged to move around the perimeter of the helical evaporator coil.

26. The apparatus of claim 25, wherein the at least one blade comprises a plurality of vanes configured and arranged to move circumferentially about helical evaporator coil.

27. The apparatus of claim 1, wherein a ratio of a heat transfer surface area of the helical evaporator coil to a volume of the cooling chamber is at least 0.02916 square feet per fluid ounce.

28. The apparatus of claim 1, wherein the mixer is configured to rotate the at least one blade at 290 or more revolutions per minute.

29. The apparatus of claim 28, wherein the mixer is configured to rotate the at least one blade at 440 or fewer revolutions per minute.

30. The apparatus of claim 1, wherein a ratio of a heat transfer surface area of the helical evaporator coil to a power consumed by the compressor is at least 0.00096 square feet per Watt.

* * * * *